Dec. 23, 1969    F. A. ADCOCK    3,485,114
PEDALS
Filed March 18, 1968

Frederick Arthur Adcock    INVENTOR:

BY

Bierman & Bierman

United States Patent Office 3,485,114
Patented Dec. 23, 1969

---

3,485,114
PEDALS
Frederick Arthur Adcock, Wollaton, England, assignor to Raleigh Industries Limited, a British company
Filed Mar. 18, 1968, Ser. No. 713,666
Claims priority, application Great Britain, Apr. 6, 1967, 15,760/67
Int. Cl. G05g 1/14
U.S. Cl. 74—594.4     3 Claims

ABSTRACT OF THE DISCLOSURE

A bicycle pedal comprises a pedal block rotatably mounted upon a spindle with a bearing means interposed therebetween, and a plate at each end of the pedal and co-operatively engaged therewith, the said plates being provided to impart a necessary degree of transverse rigidity to the pedal block.

---

The present invention concerns pedal assemblies and has particular, though by no means exclusive reference to such assemblies for application to juvenile bicycles, tricycles and the like.

The primary object of the present invention, is to provide a simple, yet effective, pedal assembly which is relatively inexpensive in manufacture.

According to the present invention, a cycle or like pedal assembly comprises a spindle, a pedal block rotatably mounted on the said spindle and located axially thereof, a bearing means between the spindle and block, and an end plate at one end, at least, of the said block, the or each plate extending transversely of the pedal block and being so engaged therewith as to give transverse rigidity thereto.

The invention will now be described further, by way of example only, with reference to the accompanying drawing in which.

Figure 1:
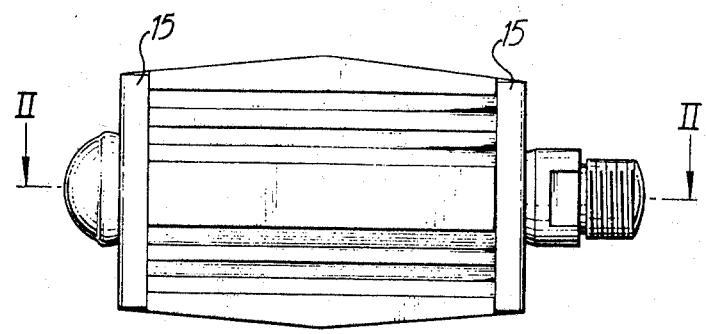
FIG. 1 is a plan view of a pedal constructed in accordance with the invention.
Figure 2:
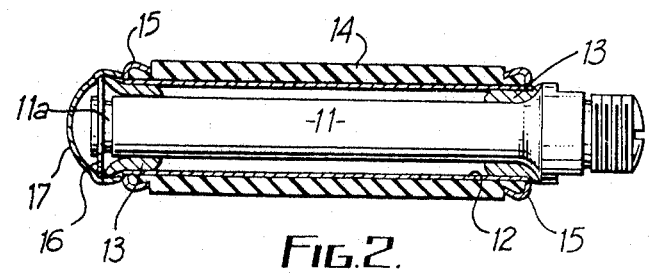
FIG. 2 is a section on line II—II of FIG. 1.
Figure 3:
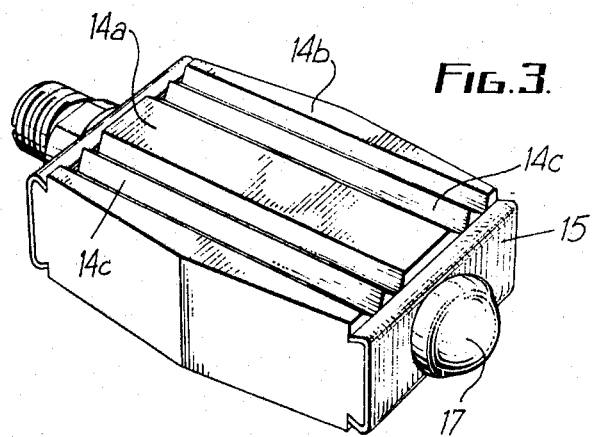
FIG. 3 is a perspective view of the pedal as shown in FIGS. 1 and 2.

Referring now to the drawings, a pedal assembly for a juvenile cycle comprises a pedal spindle 11 adapted to be secured to a pedal crank in any conventional manner, a pedal barrel 12 arranged co-axially with the said spindle and maintained in spaced disposition relative thereto by bearing bushes 13 arranged at each end thereof, a pedal block 14 mounted on the said barrel, and end plates 15 arranged one at each end of the said block and secured thereto.

Each end plate 15 has a central aperture through which the bearing bushes 13 and the ends of the pedal barrel 12 extend, such end plates being of elongate C-shaped cross-section and the ends of the block being complementarily formed to receive such plates. The sub-assembly of the pedal barrel 12 and pedal block 14 is located on the spindle 11 and axially thereof by an eccentric lock washer 16 engaging a peripheral channel 11a at the remote end of the spindle, such lock washer 16 defining an abutment at the outer extremity of the bearing bush located at such spindle end. A dust cap 17 is provided which clips over the lock washer 16 and the outer extremity of the outermost bearing bush.

The support surfaces of the pedal block 14 are ribbed so as to define a central land 14a having a flat surface thereto and a further, generally flat, surface 14b at each edge of the pedal and in spaced disposition relative to the said central land.

The surface of the pedal block between the central land and the edges of each surface is formed with longitudinal ribs 14c.

The invention is not restricted to the exact features of the embodiment hereinbefore described since alternatives will readily present themselves to one skilled in the art. Thus, for example, whilst in the embodiment illustrated we have shown two end plates, in some circumstances may be found sufficient to provide one such plate and at the remote end of the pedal assembly.

Again, the manner of location of the pedal block axially of the spindle may be by means other than that defined by an eccentric lock washer in co-operative engagement with a peripheral channel in the pedal spindle; for example, a spring washer mounted for engagement with the channel may be used if preferred.

Further, the invention is not limited in its application to pedals for bicycles and tricycles since similar pedals do find application in different contexts. Thus, for example, the pedal may be applied to any pedal propelled vehicle or pedal actuated machinery.

It is claimed:

1. A cycle or like pedal assembly comprising a spindle, a pedal block rotatably mounted on the said spindle and located axially thereof, a bearing means between the spindle and block, and an end plate at one end, at least, of the said block, each plate extending transversely of the pedal block and being so engaged therewith as to give transverse rigidity thereto; each end plate is apertured and the said bearing means extends through such aperture; an end plate is provided at least at the outer end of the pedal block, a means being provided to locate the said block axially of the spindle, such location means including an eccentric lock washer, a peripheral channel in the spindle with which said washer is in engagement, the said channel being adjacent the remote end of the spindle, and a cap adapted to position the washer radially of the spindle, the said lock washer defining an abutment thus to prevent outward movement of the block on the spindle.

2. A cycle or like pedal assembly comprising a spindle, a pedal block rotatably mounted on the said spindle and located axially thereof, a bearing means between the spindle and block, and an end plate at one end, at least, of the said block, each plate extending transversely of the pedal block and being so engaged therewith as to give transverse rigidity thereto; each end plate is of elongate C-shaped transverse cross-section and the corresponding end of the pedal blocks is complementarily formed.

3. A pedal assembly as claimed in claim 1 wherein the said cap engages the bearing means outwardly of the adjacent end plate.

References Cited

UNITED STATES PATENTS

| 402,926 | 5/1889 | Haynes | 74—594.4 |
| 1,600,010 | 9/1926 | Peace | 74—594.4 |
| 2,084,373 | 6/1937 | Anderson | 74—594.4 |
| 2,899,842 | 8/1959 | Krokos et al. | 74—594.4 |

FOREIGN PATENTS

| 671,252 | 2/1939 | Germany. |
| 1,248,799 | 11/1960 | France. |
| 1,381,966 | 11/1964 | France. |

FRED C. MATTERN, Jr., Primary Examiner

F. D. SHOEMAKER, Assistant Examiner